July 13, 1926.

T. P. DUNNE

LINE CLAMP

Filed June 22, 1925

1,592,481

INVENTOR
Thomas P. Dunne
BY H. G. Manning
ATTORNEY

Patented July 13, 1926.

1,592,481

UNITED STATES PATENT OFFICE.

THOMAS P. DUNNE, OF MERIDEN, CONNECTICUT.

LINE CLAMP.

Application filed June 22, 1925. Serial No. 38,662.

This invention relates to improvements in line fasteners, and more particularly to a clamping device for use in holding clothes lines, tent cords, and the like.

One object of this invention is to provide a device of this nature in which the line is held by a rotary cam wheel in cooperation with a body member in which the cam wheel is journaled.

A further object is to provide a device of this nature which will be simple in construction, inexpensive to manufacture, easy to manipulate, and very efficient and durable in use.

With these and other objects in view, there has been illustrated on the accompanying drawings, one form in which the invention may be conveniently embodied in practice.

Figure 1:
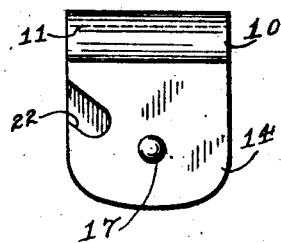
Fig. 1 represents a side view of the line clamp.

Referring now to the drawings in which like reference numerals denote corresponding parts throughout the several views, the numeral 10 indicates a body member, generally semi-cylindrical in cross-section, and having a longitudinal passage 11 adapted to receive the knotted end 12 of a cord 13.

Figure 2:
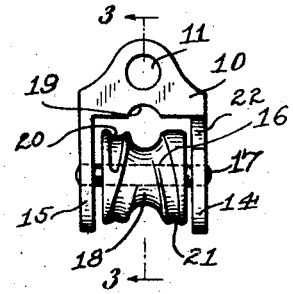
Fig. 2 is an end view of the same.
Figure 3:
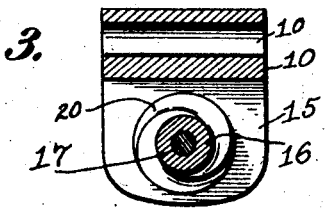
Fig. 3 is a side sectional view of the same, taken along the line 3—3 of Fig. 2 looking in the direction of the arrows.

The body member 10 is provided with a pair of side wings 14 and 15 which are arranged parallel to each other and which form bearings for a rotary cam wheel 16. As most clearly shown in Figs. 2 and 3, the cam wheel 16 is rigidly mounted upon a pivot pin 17 which is adapted to rotate in suitable apertures in the side wings 14 and 15.

The cam wheel 16 is reduced in diameter at its center to form a curved annular neck section 18 which is adapted to cooperate with a circular groove 19 in the body member 10 to form a channel for the free end of the cord 13 when said cord is held centrally and parallel to the side wings 14 and 15.

In order to lock said free end in any adjusted position, the rotary cam wheel is provided at its ends with a pair of spiral grooves 20 and 21, said grooves being oppositely pitched. By means of this construction, when the line clamp is twisted so as to bring the cord either to the right or left of its central position, the cord will be engaged by one of said grooves and held tightly against the body member 10.

For the purpose of more firmly locking the free end 23 of the cord, the side wing 14 is provided on one edge with an inclined slot 22 through which is passed the extremity of the free end 23 which projects beyond the cam wheel 16.

Figure 4:
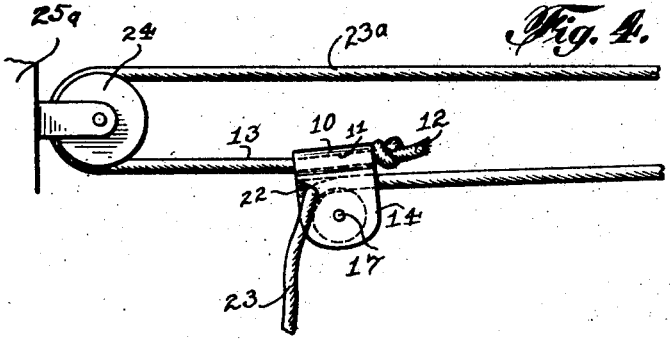
Fig. 4 is a view of the line clamp as it appears when assembled on a clothes line.

The use of the device as a clothes line clamp is clearly illustrated in Fig. 4 where the intermediate portion 23ª of the cord 13 is shown passing around a pair of pulleys 24 and 25, said pulleys being connected to a pair of posts 25ª and 25ᵇ.

Figure 5:
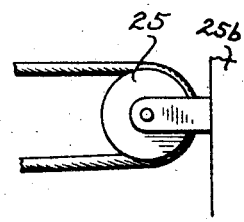
Fig. 5 is a view of the line clamp as it appears when assembled upon a tent cord.
Figure 5:
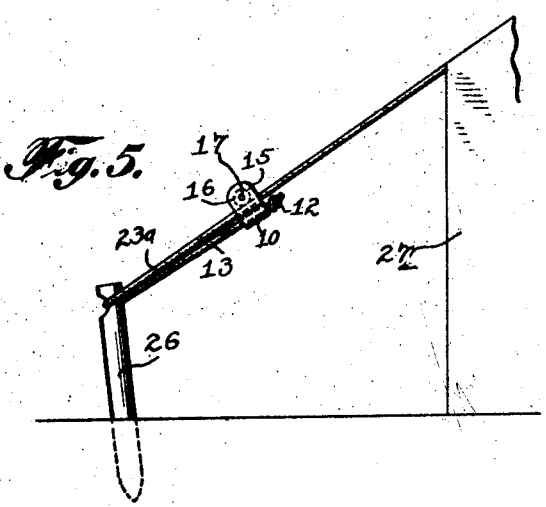

Fig. 5 illustrates the use of the device for holding a tent cord. In this figure the intermediate portion 23ª of the cord is passed around a notched stake 26 which is driven into the ground adjacent the edge of the tent 27.

In the operation of both forms of the invention, the free end of the cord may be locked in any adjusted position relative to the fixed end thereof merely by twisting the line clamp either to the right or the left so as to force the portion of the cord which engages the cam wheel out of the central channel and into one of the side grooves of said cam wheel. When the line fastener is released, the resiliency of the cord will cause said cord to be clamped by the cam wheel 16 tightly against the body member 10.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a clothes line clamp, a body member, a pair of side members depending from said body member, a rotary cam wheel journaled in said side members, said body member having a longitudinal passage to receive the knotted end of a cord, one of said side members having an inclined slot to receive the other end of said cord after it has passed around said cam wheel.

2. In a line clamp, a body member adapted to hold one end of a cord, a rotary cam wheel journaled in said body member, said cam wheel having a spiral groove in one side adapted to engage and hold the other end of said cord when said clamp is twisted, said body member having a depending wing member adjacent said cam wheel, said wing member having an inclined slot to also receive said other end and serve as an additional lock therefor.

In testimony whereof, I have affixed my signature to this specification.

THOMAS P. DUNNE.